United States Patent [19]

Sappington

[11] 4,154,309
[45] May 15, 1979

[54] HOUSING FOR FLUID ACTUATED HAND TOOL

[75] Inventor: Donald R. Sappington, St. Charles, Mo.

[73] Assignee: J & D Tool and Supply, Inc., St. Charles, Mo.

[21] Appl. No.: 851,170

[22] Filed: Nov. 14, 1977

[51] Int. Cl.² .................................................. B23B 45/00
[52] U.S. Cl. ..................................... 173/170; 173/163
[58] Field of Search ............... 173/163, 164, 165, 166, 173/167, 168, 169, 170, 60

[56] References Cited

U.S. PATENT DOCUMENTS

| 1,023,594 | 4/1912 | Prellwitz | 173/60 |
| 2,939,675 | 6/1960 | Karden | 173/169 |
| 3,181,428 | 5/1965 | Volkmann | 173/169 |
| 3,724,563 | 4/1973 | Wickham et al. | 173/163 |
| 3,753,469 | 8/1973 | Tuttle | 173/163 |
| 4,018,292 | 4/1977 | Roll et al. | 173/170 |

*Primary Examiner*—Robert A. Hafer
*Attorney, Agent, or Firm*—Paul M. Denk

[57] ABSTRACT

A housing for a fluid actuated hand tool and of the type for use as a grinder, polisher, or the like, the housing comprising a cylindrical casing formed having a cavity extending substantially inwardly thereof, the rearward portion of the casing being formed having the various passages and channels through which the pressurized air or other fluids under pressure may traverse upon manipulation of a valve for attaining entrance to the motor encased within the cavity and to induce its actuation and rotation as during usage. The casing is comprised of an integral and unitized structure, having the motor cavity formed during its molding, and a cap threads onto the end of the casing so as to hermetically secure the motor therein during tool fabrication and application. A rearwardly extending exhaust passage leads to an integrally molded conduit formed upon the casing exterior surface, with said conduit also extending substantially rearwardly along the length of the tool housing for directing the exhausted spent air to the back of the tool and thereby diverting the exhaust in a direction directly opposite from the location where the work component, such as a grinding wheel, is being applied during tool usage.

7 Claims, 6 Drawing Figures

HOUSING FOR FLUID ACTUATED HAND TOOL

BACKGROUND OF THE INVENTION

This invention relates generally to hand tools, and more particularly concerns a one piece formed casing for use as a housing for the operative components of the tool.

A great variety of hand tools are available in the prior art, and a certain segment of these tools are designed to function under a pressurized fluid, such as air. Most of these tools have mainly been designed from the standpoint of their efficiency of operation in providing actuation of their internal components, such as a rotor or other form of air motor structure, and have given lesser concern to the convenience of the user of the tool. For example, most if not all of the hand grinders that operate from pressurized air have the pressurized air entering into the housing of the tool through its rearward end, and as a matter of design convenience, simply has the air traversing directly through the air motor to attain its actuation and then exhaustment from the front of the same housing. While such is convenient and efficient for attaining an actuation of the encased air motor, the convenience of the tool user has not been fully anticipated. For example, exhausting air, which still contains some fluid pressure while dissipating from the tool housing has a tendency to cause turbulence of the grit and dust that is abrasively worn from the grinding wheel or the part upon which grinding is being done, thereby causing its entrance into the air. As a result, the blowing into the air of such dust and other grit frequently enters into the eyes, mouth, and other senses of the worker not only to cause his inconvenience, but frequently, injurious irritations.

In other hand tool embodiments where a housing is formed around a fluid actuated motor, the housing is generally constructed in sections, and after repeated usage has a tendency to weaken in structure and cause leakage of air that can significantly reduce the efficiency of operation of such a tool. Also, in those instances where thought has been given to attempting to divert the exhausting air to the side, or at least away from the area of work performance, a small insert has been used for application within the exhaust port, and thereby attempt to divert some of the exhaust laterally of the tool. Where such inserts have been used, they have generally proved rather ineffective over the prolonged useful life of the hand tool involved.

Other types of prior art forms of pressurized fluid motors, pumps, or tools are shown in the earlier U.S. Pat. to Darlington, No. 1,225,224, and the U.S. Pat. to Albertson, No. 3,676,013.

In view of the foregoing, it is the principal object of this invention to provide a molded casing having integral and rearwardly extending exhaust conduit for forming the unitized housing for a hand tool that fully attains exhausting of any spent gases or fluids away from the area of work.

Another object of this invention is to provide a unitized casing for hermetically sealing the operating components, or motor, into a pressurized air actuated hand tool.

A further object of this invention is to provide a hand tool having an integrally formed casing that exhausts its spent air away from the work area.

Yet a further object of this invention is to provide a hand tool having guard means that serves to protect the hand of the user while doubling as a means for suspending the tool during non usage.

Yet another object of this invention is the provision of conveniently located passages and cavities within a unitized casing for hand tool that enhances the delivery of pressurized air to its motor and thereby significantly increases the efficiency of its operations.

Still another object of this invention is the provision of a one piece casing that can be molded as an integral item thereby greatly reducing the time and effort required for mass assembly of the tool for marketing.

A further object of this invention is the provision of a unitized casing for a hand tool that may be conveniently molded from materials such as a plastic, in a very simple and fascile manner, requiring a minimum of skilled labor in its production.

These and other objects will become more apparent to those skilled in the art upon reviewing the summary of this invention, and upon undertaking a study of the description of the preferred embodiment in view of its drawings.

SUMMARY OF THE INVENTION

This invention contemplates a hand tool of the type that attains its power from a pressurized fluid, such as air under pressure, having its rotor or motor means contained within, and usually, hermetically sealed, in a housing, as in this particular instance, formed as a unitized casing. The casing is formed as a cylindrical member having a cavity provided approximately mid way into and through its interior, and in which the air motor is snugly located during assembly of the said tool. A cap means is connectable with the frontal end of the said casing, usually by means of a threaded or other type of connection, so as to preferably provide a hermetic seal at this location and thereby enhance the efficiency of operation of the tool during its functioning.

Integrally molded onto the unitized casing, as during its formation, is a conduit that communicates by means of a passage with the interior of the casing cavity, and which passage and conduit are directed rearwardly of the tool so as to provide for a discharge and exhausting of the spent air rearwardly of the tool during its application. The conduit, as previously explained, is integrally molded with the formed casing, and therefore, contains sufficient rigidity to withstand the pressures of both the air entering into the casing and the exhausting gases that egress from the tool housing by way of this formed conduit. Various other passages and inlet ports are conveniently located preferably within the rearward portion of the molded casing, behind the location of its internally contained air motor, and these passages include means for connection of an adapter for securement of an air line or other pressurized fluid line to the back end of the tool, with such port communicating with a valve chamber in which a valve means may be hand manipulated for regulating the entrance of a pressurized fluid to the motor, as during its intended operation, or to curtail the passage of such fluid to the motor, as during the tool nonusage. In any event, the valve means cooperates with a lever that may pivotally mount on a side of the formed casing, as if pivoted about one end of the lever, and through the effort of hand force of the user provides for an opening of the normally closed valve for attaining the operations of the said tool. The various passages formed within the rearward portion of the molded casing also include a pair of communicating elongated slot and channel that conveniently direct the air under pressure to the entranceway into the air motor to attain its revolving, and at the same time, have the motor's outlet conveniently aligned with the aforesaid outlet passage, and one that is generally oriented in a rearward direction, for directing the exhausting air into the exhaust conduit for a rearward disposition of the spent air or other operative fluid.

The unitized casing of this invention is further formed in the manner that adds to the convenience of its operation, and safety of its usage. For example, a series of longitudinally disposed integral flutes are formed upon the exterior surface of the casing, and thereby adds adherence of the hand tool to the grasp of the worker during usage. Thus, any perspiration or other greasy matter upon the hand of the worker will not necessarily cause slippage of the tool during its application, and this can be attributed to the arrangement of the roughened fluted surface provided upon the tool housing, or more particularly its specifically formed casing.

DESCRIPTION OF THE PREFERRED EMBODIMENT

Figure 1:
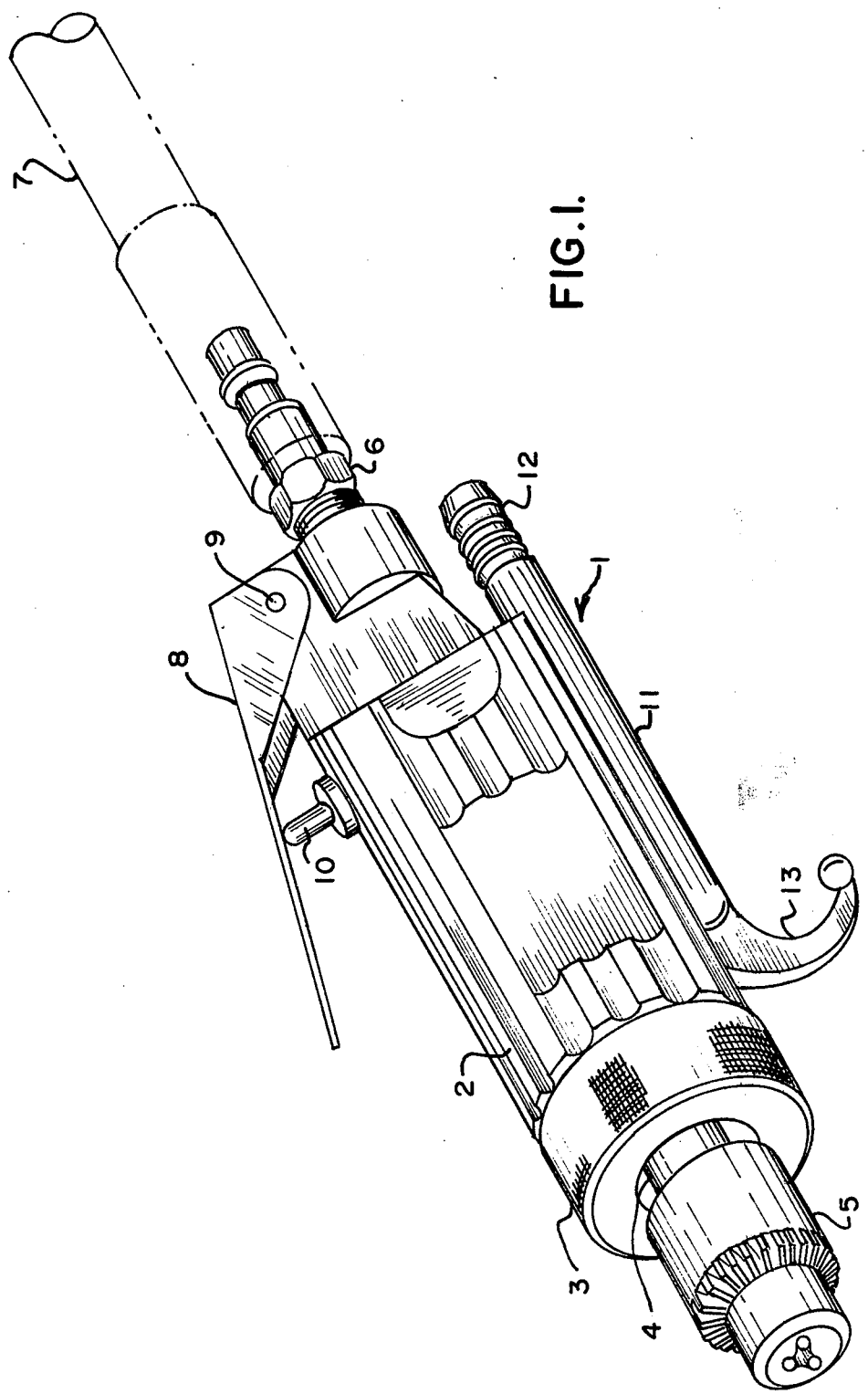
FIG. 1 provides an isometric view of the hand tool of this invention disclosing an air line connecting with its rearwardly extending inlet port, with a forwardly extending chuck being secured to the shaft of the tool motor.
Figure 2:
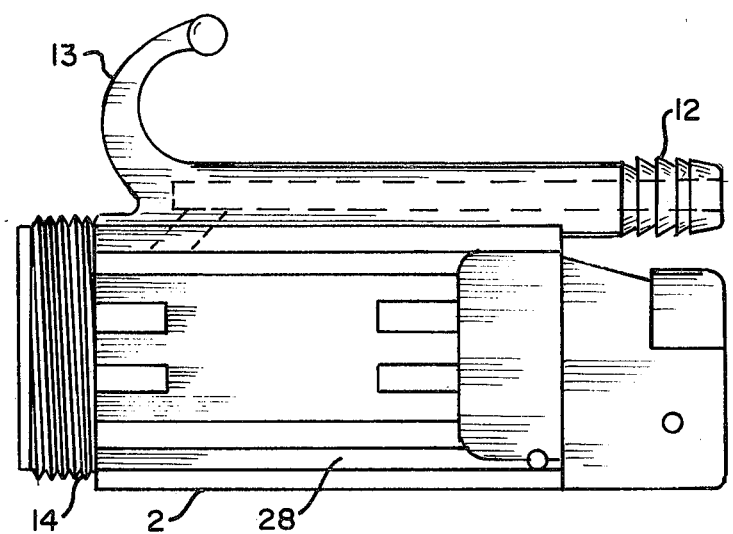
FIG. 2 provides an inverted side view of the unitized casing of the hand tool of this invention.
Figure 3:
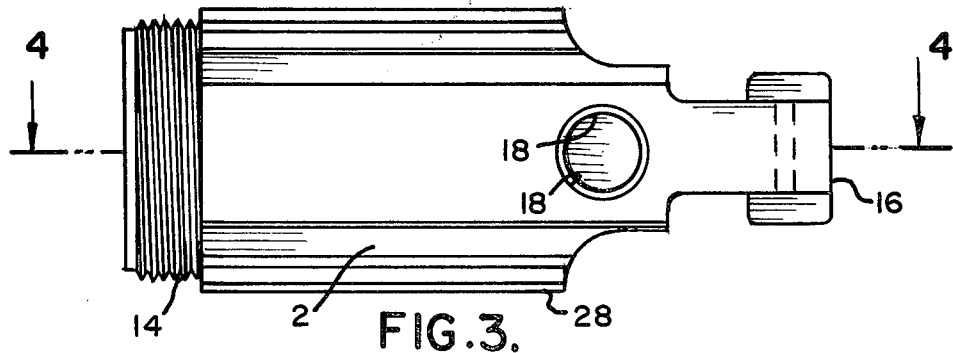
FIG. 3 provides a top view of the casing of FIG. 2.

In referring to the drawings, and in particular FIG. 1, there is disclosed the hand tool 1 of this invention comprising its unitized casing 2, which has connected, as by threaded or other type engagement, to its forward end, a cap 3, that holds the fluid motor, such as the air motor (not shown) within the said casing. Extending through the cap means 3 is the shaft 4 of the said motor and which has a chuck 5 secured thereto and for use in supporting a grinder (not shown) or other form of working instrumentality or component that may be secured thereto, and which is useful for achieving a particular operation by a mechanic.

Securing with the back end of the casing 2, as through the agency of an adapter 6, is an air line 7 that is useful for conveying the fluids, such as air, under pressure to and through the overall housing for the tool for providing actuation of its motor, and as a result, a rapid turning of its grinder or other instrumentality, as previously explained, and which will be held by means of the chuck 5. Shown pivotally mounted proximate the back end of the said casing is a hand lever 8, being pivotally connected by means of and about the pin 9, and disposed for biasing against a rod 10 that actuates valve means normally contained within the casing and which allows for the entrance or curtailment of the air under pressure to the said motor, all through the simple manipulation of this conveniently disposed hand lever 8.

Further integrally connecting with the casing 2 is a conduit 11, that, as will be hereinafter explained, conveniently provides for the rear discharge of any exhausting air or fluid egressing from the hand tool during its functioning. Thus, and as can be seen, the instrumentalities for conveying to or discharging of the air or other fluids under pressure to an from this hand tool are all operatively associated with the back end of the same, thereby preventing any agitation of the grit or other dust accumulating proximate the vicinity of the worked on components during its usage. The back end of the conduit 11 is formed as a barbed hose fitting 12 that is useful for facilitating the insertion and retention of an exhaust hose (not shown) that may be coupled onto the same so as to convey the exhausting air to a remote location and away from the user of this hand tool. Integrally formed extending forwardly of the conduit 11, and also molded with the casing 2 is a hook means 13 that is useful for two purposes; one to provide a frontal shield for the finger or hand of the user of the instrument during its usage, and thereby to prevent the hand from slipping forwardly on the tool, during its application, and thereby injuriously encountering the work component, such as a grinder, that is rapidly turning just forwardly thereof. In addition, and secondly, the hook means 13 is useful for providing a means for suspending or hanging of the tool during its nonuse. It is to be noted that the conduit 11 is integrally formed and connects with the casing 2 along almost its full length.

Figures 4, 5, 6:
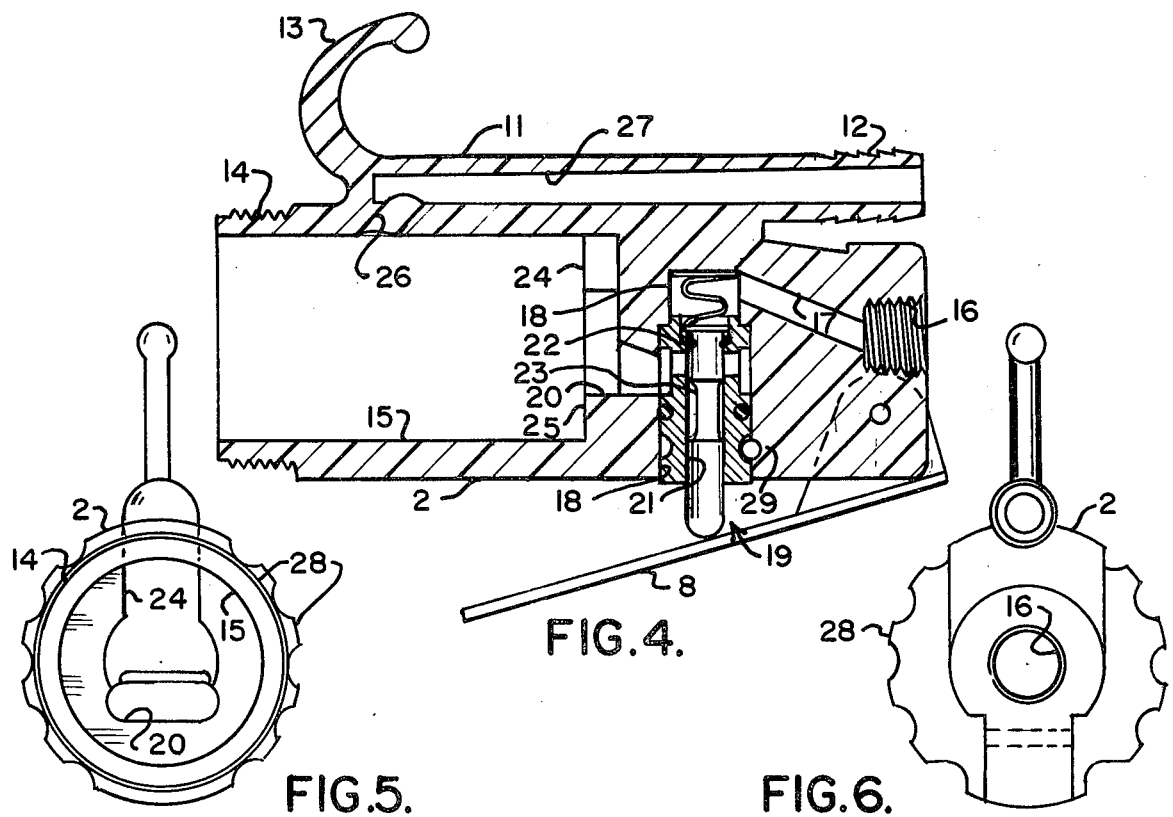
FIG. 4 furnishes a longitudinal sectional view through the casing taken along the line 4—4 of FIG. 3.
FIG. 5 provides a front end view of the casing of FIG. 2.
FIG. 6 furnishes a back end view of the casing of FIG. 2.

The various internal operating characteristics of this hand tool, and more particularly of its casing, can be seen in FIGS. 2 through 6. As shown, the casing 2 has the threaded end 14 provided forwardly thereof and upon which the cap means 3 may be tightened, as previously explained. Extending inwardly of the forward end of the cylindrical casing 2 is a cavity 15 and into which the air or other fluid actuated motor (not shown) may be inserted during assembly of this tool. The cavity extends approximately to the midpoint of the overall length of the casing, thereby providing more solid molded structure at its rearward vicinity and through which the various passages and chambers are provided for furnishing the controlled regulation of the entrance of air under pressure to the said motor. Provided at the back end of the casing is an inlet port 16, being threaded, and into which the adapter 6 may be connected. A passage 17 leads to a chamber 18 and in which the stem of the valve means 19 inserts, being spring biased downwardly, as shown, for normally closing the passage through the said chamber and into the slot 20 formed into the base 25 of the cavity 15 formed within the casing. As shown in FIG. 5, the slot 20 is elongated in width, thereby providing clear access of any air bypassing the valve means 19, as when its hand lever 8 is pivoted for further insertion of the valve stem 21 inwardly of the chamber 18 and thereby opening its seat, as at 22, for allowing air to pass through the valve means openings 23, through the elongated slot 20, and to the air motor of the tool. A further channel 24 extends upwardly within the said base 25 of the casing, so that the air under pressure will be directed for immediate entrance into the aligned intake of the air motor itself, for attaining its actuation and rotation of the working component, such as the grinder etc. as previously explained. Leading from the cavity 15 is an outlet passage 26, which is slightly rearwardly inclined, and which opens into the passage 27 that is provided longitudinally through the conduit 11 and for directing the exhausting air from the casing rearwardly of the tool. As previously explained, one of the advantages of this invention is the rearward discharge of the exhausting air so to prevent its release at the vicinity where work is being performed during usage of this tool.

Various other means are provided in this hand tool so as to facilitate its use. For example, the casing 2 is provided with a series of longitudinally arranged flutes or ribs, as at 28, so as to insure its firm grasp by the hand of the worker. Furthermore, and as can be seen, in FIG. 4, a locking pin 29 may be inserted through the casing and overlap it and the valve means 19 so as to insure the keying of the valve means within the chamber 18 of the housing, and prevent its untimely removal particularly when air under high pressure is passing through the tool from the air line 7.

Various modifications or changes to the design of this unitized casing, and the housing for a hand tool as constructed in general, may occur to those skilled in the art upon reviewing the subject matter of this disclosure. Any such modifications or changes, if within the spirit of this invention, are intended to be encompassed by any claims to patent protection issuing upon this invention. The description previously given of this invention is set forth for illustrative purposes only and for providing an analysis and understanding of its preferred embodiment.

Having thus described the invention what is claimed and desired to be secured by Letters Patent is:

1. A unitized Housing for a hand tool of the type incorporating a pressurized fluid operative motor for effecting rotation of its rotor and shaft and any work component secured thereto and projecting from the housing front thereof, comprising a one-piece cylindrical casing having a cavity extending into its front end thereof and of a size to accommodate the retention of the motor therein, the rearward portion of the said casing incorporating means for furnishing the controlled channeling of the pressurized fluid to the motor for inducing its actuation, said means including an inlet port, a supply of fluid under pressure coupled to said inlet port, a valve means provided in said rearward portion and regulating the flow of the pressurized fluid to the said motor, an outlet passage through the said casing, and conduit integrally formed upon said casing and extending substantially the length of the said casing and communicating with the said outlet passage and extending rearwardly thereof directly opposite from any projecting work component for exhausting the spent fluids to the rear of the hand tool and away from the location of the performance by its said work component.

2. The invention of claim 1 and including a guard means projecting from the surface of the casing and integrally arranged forwardly of the said exhaust conduit, said guard means being useful for protecting the hand of the user of the said tool.

3. The invention of claim 2 wherein said guard means includes a curved portion for use in facilitating the suspension of the tool during non usage.

4. The invention of claim 1 wherein said outlet passage inclines rearwardly of the casing to direct the exhausting fluid towards the back of the hand tool during its functioning.

5. The invention of claim 4 and wherein said exhaust conduit projects integrally rearwardly of the cylindrical casing, and said projecting end includes means for securing an exhaust line thereto.

6. The invention of claim 5 wherein said securing means includes a barbed hose fitting for securing an exhaust line thereto.

7. The invention of claim 3 and wherein said cylindrical casing is exteriorly fluted to facilitate its grasping during usage.

* * * * *